United States Patent

Mattes et al.

[11] Patent Number: 5,903,062
[45] Date of Patent: May 11, 1999

[54] ELECTRONIC DEVICE

[75] Inventors: Bernhard Mattes, Sachsenheim;
Siegfried Malicki, Ingersheim;
Hartmut Schumacher, Freiberg, all of Germany

[73] Assignee: Robert Bosch GmbH, Stuttgart, Germany

[21] Appl. No.: 08/860,877

[22] PCT Filed: Dec. 21, 1995

[86] PCT No.: PCT/DE95/01828

§ 371 Date: Sep. 25, 1997

§ 102(e) Date: Sep. 25, 1997

[87] PCT Pub. No.: WO96/21584

PCT Pub. Date: Jul. 18, 1996

[30] Foreign Application Priority Data

Jan. 11, 1995 [DE] Germany .................. 195 00 582

[51] Int. Cl.[6] .................................................. B66K 28/14
[52] U.S. Cl. .................... 307/10.1; 180/282; 280/735
[58] Field of Search ................................. 307/9.1, 10.1;
280/727, 728.1, 728.2, 734, 735, 736, 742,
801.1, 801.2, 802, 803, 805, 806; 180/271,
272, 273, 274, 282; 701/1, 29, 33, 36, 45,
46, 49

[56] References Cited

U.S. PATENT DOCUMENTS

| 5,309,030 | 5/1994 | Schultz ................................. 307/10.1 |
| 5,411,289 | 5/1995 | Smith et al. ........................... 280/735 |
| 5,461,358 | 10/1995 | Ravas, Jr. et al. ................... 307/10.1 |
| 5,531,472 | 7/1996 | Semchena et al. .................. 307/10.1 |
| 5,533,756 | 7/1996 | Dybro et al. ........................... 200/806 |
| 5,554,890 | 9/1996 | Kinoshita .............................. 307/10.1 |
| 5,596,497 | 1/1997 | Honda .................................... 307/10.1 |
| 5,608,269 | 3/1997 | Frendt et al. ........................... 307/9.1 |
| 5,626,359 | 5/1997 | Steffens, Jr. et al. ................. 280/735 |
| 5,718,451 | 2/1998 | White ..................................... 280/735 |

OTHER PUBLICATIONS

Ingenieurs de l'Automobile, 1982, vol. 6, pp. 69–77.

*Primary Examiner*—Richard T. Elms

[57] ABSTRACT

An electronic device, in particular a safety device, for occupants of a vehicle has a push-pull output element controlled by an astable flip-flop with outputs via decoupling elements. The astable flip-flop and the decoupling elements receive operating voltage over a switching element that switches at a given acceleration threshold.

10 Claims, 3 Drawing Sheets

ELECTRONIC DEVICE

FIELD OF THE INVENTION

The present invention concerns an electronic device, and in particular, a safety device for occupants of a vehicle.

BACKGROUND INFORMATION

An electronic safety device-for occupants of a vehicle is known, for example, from the journal article 1141 in Ingénieurs de l'Automobile (1982) No. 6, pp. 69–77. For conventional safety devices of this type, the protection means for the occupants, such as an air bag and/or seat belt tensioner or the like is released by activating a "squib," or firing pellet, at the output element of an electronic circuit. The squib, basically in the form of a resistor wire, is activated using a current generated by the car battery itself or by a capacitor provided as a reserve power source. In response to a sensor signal indicating an accident situation provided by an acceleration-sensitive sensor, the entire current necessary to activate the squib is supplied at once to the squib. Normally, no interruption of the ignition process is provided or possible.

Recently the applicant has developed some particularly smart safety devices, wherein the amount of energy required for activating the ignition element or squib is supplied not at one time, but as if in packets in the form of a number of current pulses over time. This principle, known in the industry as AC ignition, allows for a particularly sensitive ignition of the ignition elements, allowing intervention in and influencing the ignition process even after the start of the ignition process. It is even possible to interrupt an ignition process already initiated if, for example, on the basis of the current measured values of the acceleration-sensitive sensor it is established that an acceleration signal initially deemed as particularly critical was not actually caused by a critical accident situation.

SUMMARY OF THE INVENTION

The solution according to the present invention allows a particularly simple design of an electronic device to be implemented using the novel AC ignition principle developed by the applicant. The present invention is based on the principle that AC ignition can also be implemented in a simple manner by providing a signal generator that activates the ignition elements of the various protection means for the occupants of the vehicle, which in turn can be controlled by a simple mechanical acceleration switch. A particularly inexpensive mechanical acceleration switch, to control a relatively low supply current for the signal generator control electronics, can be used for controlling the signal generator. The current for the ignition elements proper does not have to pass through these mechanical acceleration switches. The electronic device is also characterized by an exceptionally simple design and a relatively low cost. Thus it is possible to use a plurality of such electronic devices in an automobile if needed without a substantial increase in cost. This is particularly advantageous, since currently even mass-produced automobiles have a large number of passenger safety devices for the occupants and consequently output elements assigned thereto. In addition, the electronic device has, of course, the advantages basically associated with AC ignition. This provides considerably increased assurance, in particular compared to conventional safety devices, against undesirable faulty triggering. Even short-circuits of the ignition lines downstream from the positive or negative terminal of the supply voltage cause no faulty triggering.

Furthermore, no short-circuit bridges are needed in the ignition circuit connectors to suppress voltage injections and undesirable currents over the squibs. Even faults in the vehicle's cable harness will not cause faulty triggering of the safety devices.

DETAILED DESCRIPTION

Figure 1:
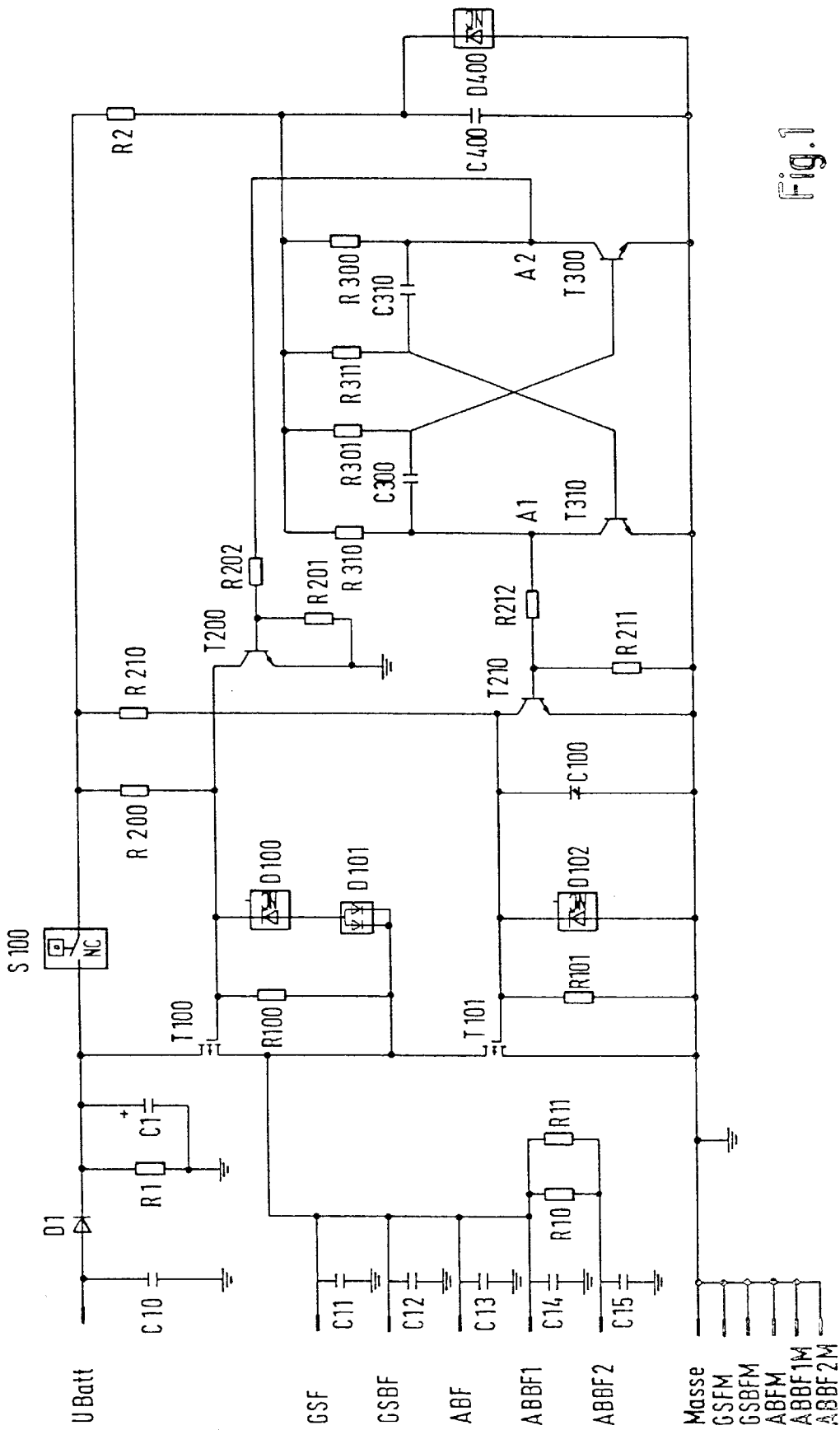
FIG. 1 shows a first embodiment of the electronic device as a block diagram, including the acceleration-sensitive sensor, from the battery terminal to the connecting lines leading from the output element to the protection devices (not shown in the drawing)

FIG. 1 shows the block diagram and the wiring diagram of a first embodiment of the electronic device according to the present invention. The device can be connected to the vehicle's ground and to the positive terminal of the vehicle's battery UBatt. A capacitor C10 is connected between terminal UBatt and the ground. Furthermore, the anode of a diode D1 polarized in the direction of the current, is connected to the UBatt terminal; the cathode of diode D1 is connected to the first terminal of a resistor R1, whose second terminal is grounded. A capacitor C1, whose second terminal is also grounded, is connected to the cathode terminal of diode D1. A first terminal of an acceleration sensor S100, whose other terminal is connected to a resistor R2, is also connected to the cathode terminal of diode D1; the second terminal of resistor R2 is connected to a capacitor C400, whose second terminal is grounded. The first sensor S100 is preferably a mechanical acceleration sensor, configured as a Reed switch. Electrically, it basically represents a working contact that is actuated, closing an electric circuit, under the effect of acceleration, particularly after attaining a predefinable acceleration threshold. An acceleration value between approximately 4 and 6 g, in particular a value of approximately 5.6 g can be predefined. Here g designates the acceleration of gravity. Resistor R1 and capacitor C1 form an "energy reserve" with capacitor C1 loaded via diode D1 and the UBatt terminal of the vehicle battery. Such energy reserves are provided in safety devices of this type particularly because the relatively heavy car battery is easily detached from its connecting terminals in an accident, so that power supply from the car battery is no longer possible. In this case the electronic device should be capable of receiving power for an additional, predefinable, period of time from the energy reserve. A high-capacitance electrolytic capacitor, with a capacitance of, for example, a few thousand microfarads, is preferably used as capacitor 1. A diode D400, polarized in the non-conducting direction, is connected in parallel to capacitor C400. Resistor R and diode D400 are used to stabilize the supply voltage of the electronic device. A Zener diode with a suitable voltage value is preferably used as diode D400. The electronic device furthermore has an astable flip-flop used as a signal generator, which comprises the following components: capacitors C300, C310; resistors R300, R310 and E311; switching elements T300 and T310. Preferably semiconductor switching elements, in particular bipolar transistors, are used as switching elements T300 and T310. The output terminals of the astable flip-flop, i.e., the connecting points of resistor R310 with capacitor C300 and of resistor R300 with capacitor C310, are connected to respective buffer or decoupling elements. The first decoupling element comprises resistor R200, switching element T200, as well as resistors R202 and R201. A terminal of resistor R202 is connected to the connection point of resistor R300 to capacitor C310. The other terminal of resistor R202 is connected to a terminal of resistor R201, whose other terminal is grounded; this terminal of resistor R202 is also connected to the control electrode of switching element T200. Here also a semiconductor switching element, such as a bipolar transistor, is used as a switching element. The emitter terminal of this switching element T200 is grounded, while the collector terminal of switching element T200 is connected to a terminal of resistor R200, whose other terminal is connected to the output terminal of sensor 100. The second decoupling element comprises resistor R210, switching element T210, and resistors R211 and R212. One terminal of resistor R212 is connected to the connecting point between resistors R310 and capacitor C300. The other terminal of resistor R212 is connected to a terminal of resistor R211, whose second terminal is grounded. Furthermore, this second terminal of resistor R212 is connected to the control electrode of switching element T210. This switching element, like switching element T200, is also a semiconductor switching element, in particular a bipolar transistor, whose emitter terminal is also grounded. The collector terminal of switching element T210 is connected to the output terminal of sensor S100 via resistor R210. The collector terminals of switching elements T200 and T210 are connected to control electrodes of output elements T100 and T101, respectively. An output terminal of switching element T100 is connected with the cathode terminal of diode D1, while an output terminal of switching element T101 is connected to the ground terminal. One output terminal of switching element T100 is connected to one output terminal of switching element T101 and to output terminals GSF, GSBF, ABF, ABBF1, and ABBF2.

These abbreviations have the following meanings: GSF stands for driver seat belt tensioner. Thus, a connecting line goes from this output terminal to the ignition element triggering the seat belt tensioner for the driver of the car. The abbreviation GSBF stands for front-seat passenger seat belt tensioner. This output terminal is therefore connected with the ignition element responsible for triggering the seat belt tensioner for the front-seat passenger. The abbreviation ABF stands for driver-side airbag and therefore it means that this output terminal is connected to the ignition element responsible for triggering the airbag provided for the driver. The abbreviation ABBF1 means front-seat passenger 1 airbag and therefore it means that this output terminal is connected to the ignition element responsible for triggering the airbag provided for the first front-seat passenger. Finally, ABBF2 means front-seat passenger 2 airbag and thus it means that this output terminal is connected to the ignition element responsible for triggering the airbag provided for the second front-seat passenger. The above-mentioned ignition elements are ignition elements provided in connection with the AC ignition technology developed by the applicant, comprising a series connection of a relatively low-capacitance capacitor with squib. The other pole of each ignition element is connected to the ground terminal. This can be seen from the corresponding terminal designations on the ground terminal in the lower left portion of the figure.

Figure 2:
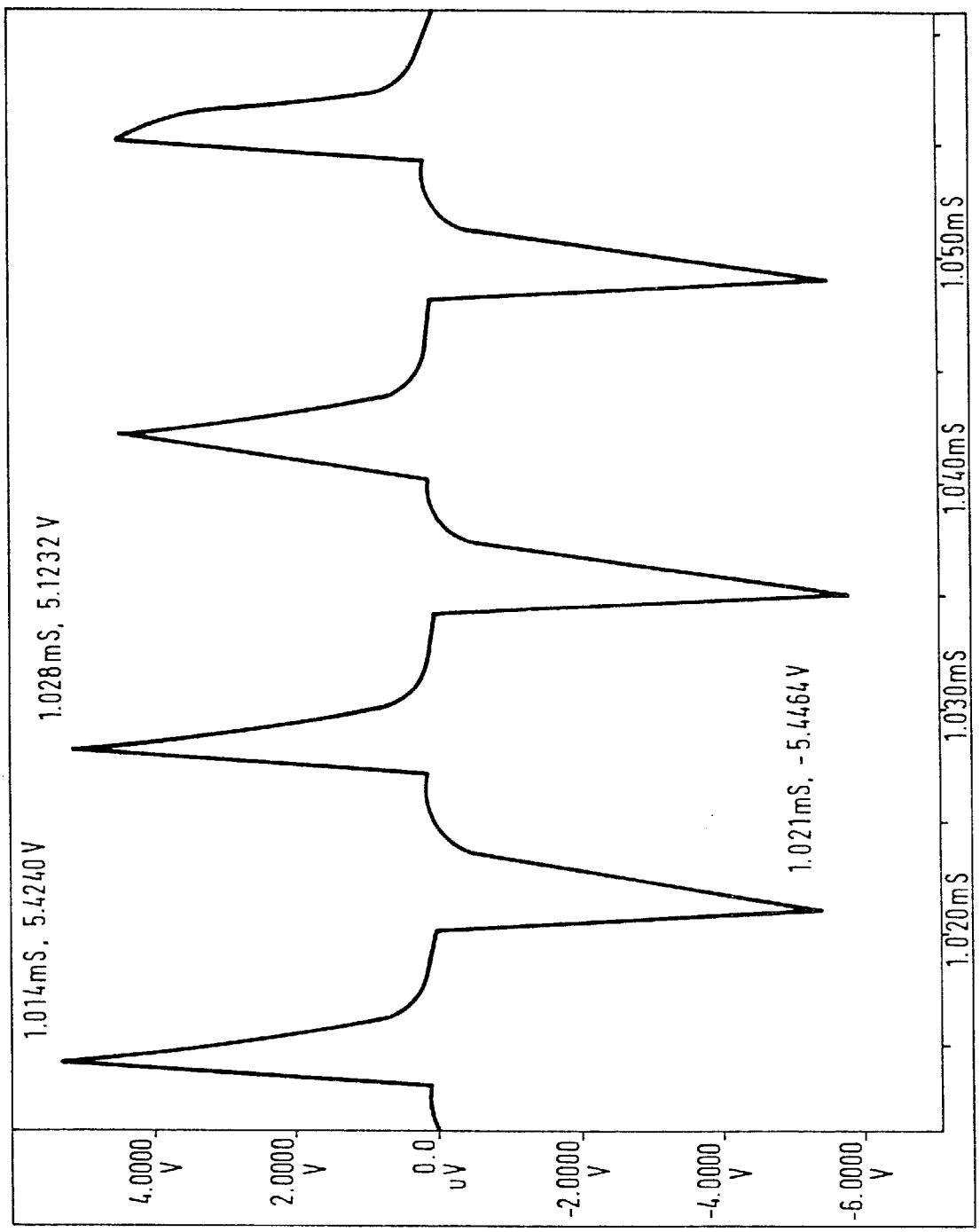
FIG. 2 shows a pulse diagram of the voltage at an ignition element.

In the following, the function of the electronic device will be described. When the vehicle is started, the voltage of the vehicle battery is applied to the circuit arrangement shown in the figure through terminal UBatt, charging capacitor C1 provided as an energy storage device via diode D1. Sensor S100, configured as a mechanical acceleration sensor, remains in the open position shown under the normal operating conditions of the vehicle, so that in particular the astable flip-flops or the decoupling elements are not connected to the operating voltage. Only when the vehicle acceleration exceeds a given threshold value, which can be, for example, between approximately 4 g and 6 g, in particularly approximately 5.6 g, is sensor S100 brought to its other switching position by the effect of acceleration, causing an electrical connection, i.e., a closed circuit, to be established and the operating voltage UBatt to be applied to the astable flip-flop and the two decoupling elements. Then the astable flip-flop operating as a signal generator generates two output signals in phase opposition on its two output terminals A1, A2, preferably in the form of square signals, with a frequency of some tens of kHz. The frequency of these output signals is approximately between 50 kHz and 90 kHz, preferably approximately 70 kHz. The switching edges of the square output signals are made steeper in decoupling elements containing switching elements T200 and T210 so that the downstream output switching elements T100, T101 do not operate in their active range and do not become conductive at the same time. The output element comprising switching elements T100, T101, as well as the respective resistors R100, R101, and diodes D101, D100, D102 is activated with these square signals in phase opposition. On the output side, as mentioned previously, this output element controls the various ignition elements. FIG. 2 shows the pulse diagram of the voltage applied to an ignition element with a resistance of approximately 2 ohms. The pulse diagram shows that this is a bipolar signal with a maximum amplitude barely below ±6 V. If the respective ignition element receives the control signal represented in FIG. 2 with sufficient frequency, a sufficiently large current is passed through the ignition element, which ultimately activates the ignition element.

Figure 3:
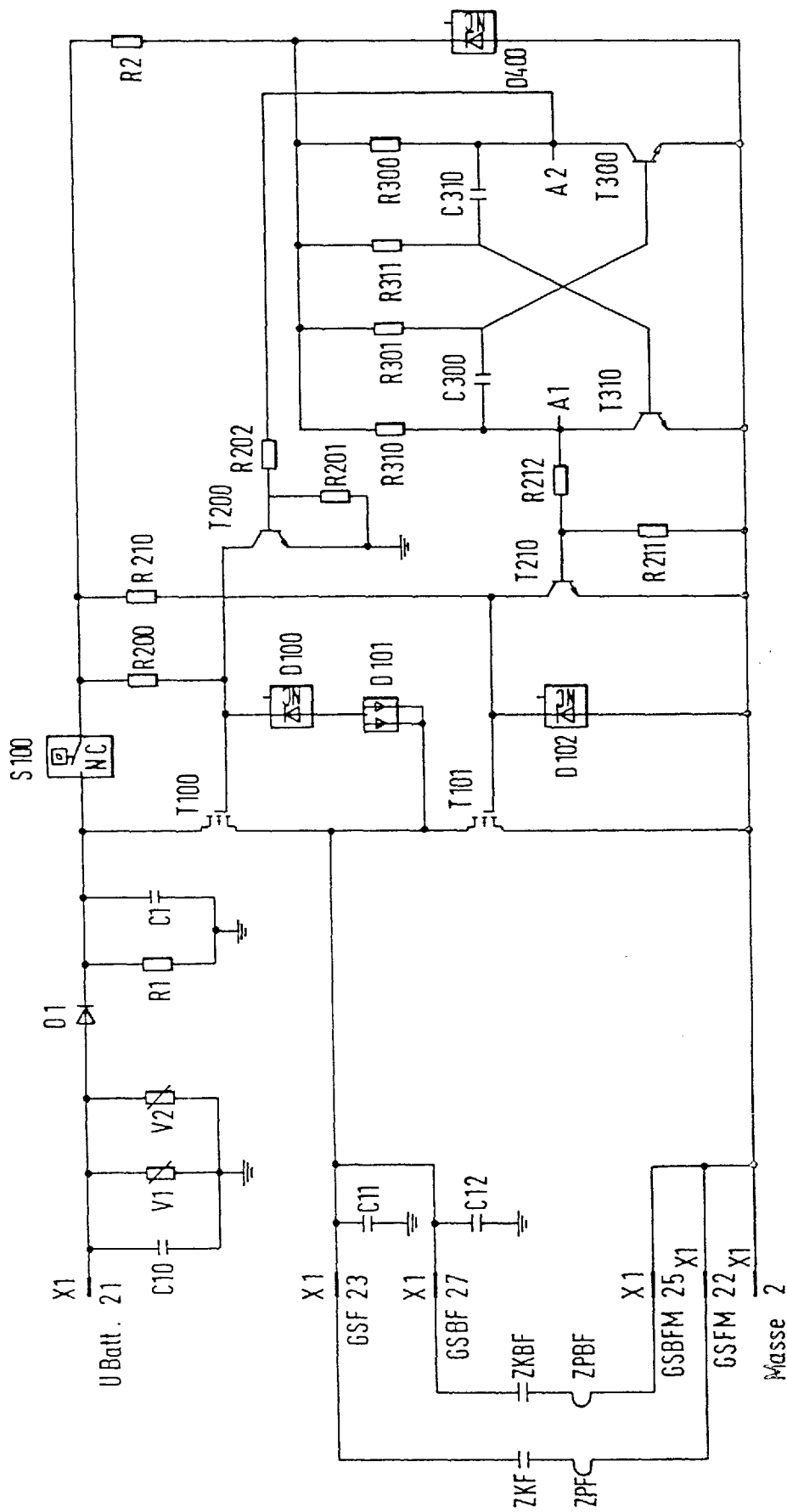
FIG. 3 shows a second embodiment of the electronic device.

A second embodiment of the device according to the present invention is shown in FIG. 3. It differs from the embodiment shown in FIG. 1 basically by there being only two ignition circuits, since the electronic device is provided for triggering seat belt tensioners. Therefore one ignition circuit is denoted as GSF, standing for "driver seat belt tensioner," while the second ignition circuit is denoted as GSBF, standing for "front-seat passenger seat belt tensioner." An ignition element comprising a squib ZPF and ZBPF and a capacitor ZKF and ZKBF, respectively, is arranged in each of ignition circuits GSF and GSBF.

What is claimed is:

1. An electronic safety device for at least one occupant of a vehicle, comprising:

an acceleration-sensitive sensor;

a circuit coupled to the acceleration-sensitive sensor and generating electrical oscillations for gradual activation of an output element; and at least one ignition element including a squib and a capacitor connected in series with the squib, wherein the at least one ignition element is activated by the output element.

2. The electronic safety device according to claim 1, wherein the output element is configured as a push-pull output element, and the circuit generating the oscillations includes a signal generator having at least one astable flip-flop.

3. The electronic safety device according to claim 2, wherein output terminals of the at least one astable flip-flop are connected to control electrodes of a pair of output switching elements via a plurality of decoupling elements.

4. The electronic safety device according to claim 2, further comprising:

switching means for connecting the at least one astable flip-flop and a plurality of decoupling elements to an operating voltage in response to an acceleration of the vehicle.

5. The electronic safety device according to claim 2, wherein the acceleration-sensitive sensor includes a switching means for connecting the at least one astable flip-flop and a plurality of decoupling elements to an operating voltage.

6. The electronic safety device according to claim 2, wherein the at least one astable flip-flop generates substantially square oscillations with a frequency between 50 kHz and 90 kHz.

7. The electronic safety device according to claim 6, wherein the frequency is approximately 70 kHz.

8. The electronic safety device according to claim 1, wherein the acceleration-sensitive sensor includes a mechanical acceleration switch that switches at a predefined acceleration threshold.

9. The electronic safety device according to claim 8, wherein the predefined acceleration threshold is between 4 g and 6 g.

10. The electronic safety device according to claim 9, wherein the predefined acceleration threshold is approximately 5.6 g.

* * * * *